United States Patent [19]

Bickle et al.

[11] 4,394,275

[45] Jul. 19, 1983

[54] COMPOSITE MATERIAL FOR SLIDING SURFACE BEARINGS

[75] Inventors: Wolfgang Bickle, Reilingen; Rolf Funke, Bad Schönborn; Rolf Pfoh, Rauenberg, all of Fed. Rep. of Germany

[73] Assignee: Karl Schmidt GMBH, Neckarsulm, Fed. Rep. of Germany

[21] Appl. No.: 283,394

[22] Filed: Jul. 15, 1981

[30] Foreign Application Priority Data

Jul. 19, 1980 [DE] Fed. Rep. of Germany ....... 3027409

[51] Int. Cl.³ .............................................. C10M 5/18
[52] U.S. Cl. .................................... 252/12; 252/12.2
[58] Field of Search ................................. 252/12, 12.2

[56] References Cited

U.S. PATENT DOCUMENTS 2,995,462  8/1961  Mitchell et al. ...................... 252/12
3,896,036  7/1975  Cairns ................................... 252/12
3,935,159  1/1976  Demillecomps et al. ............. 252/12

OTHER PUBLICATIONS

Machinenmarkt/MM-Industrie Journal 77, NO. 6, "Lager Ohne 01", Jan. 19, 1971.
VDI-Z 110 (1968), No. 15, pp. 632-636.

Primary Examiner—Jacqueline V. Howard
Attorney, Agent, or Firm—Sprung, Horn, Kramer & Woods

[57] ABSTRACT

A composite material for sliding surface bearings comprises a gacking shell of steel, which is covered by a bearing metal layer of sintered porour bronze having a porosity of 25 to 45%. The voids of the bronze layer are filled with a fluorocarbon-lead mixture. The bearing metal layer is covered by an anti-friction layer consisting of the fluorocarbon-lead mixture in a thickness of, for example, 30 to 500 microns.

To permit of a machining of the anti-friction layer the bronze layer has a thickness of 250 to 350 microns and a porosity of 25 to 45% and the fluorocarbon-lead mixture comprises 30 to 60% by weight polyvinylidene fluorinde and 20 to 50% by weight lead.

8 Claims, 3 Drawing Figures

COMPOSITE MATERIAL FOR SLIDING SURFACE BEARINGS

BACKGROUND OF THE INVENTION

1. Field of the Invention

This invention relates to a composite material for sliding surface bearings, comprising a supporting shell of steel, which is covered by a bearing metal layer comprising sintered porous bronze, which has a porosity of 25 to 45% and the voids of which are filled with a fluorocarbon-lead mixture and which is covered by an antifriction layer comprising the fluorocarbon-lead mixture in a thickness of 30 to 500 microns.

2. Discussion of Prior Art

In such a composite material for sliding surface bearings, a copper-plated or non-copper-plated steel backing is provided with a sinter-bonded layer, which has a thickness of 250 to 350 microns and has been made from spherical, nodular or irregularly shaped tin bronze powder having a particle size of 150 to 175 microns. The porous bronze layer has a porosity of 35 to 45% and its voids have been entirely filled in a rolling operation with a mixture of polytetrefluoroethylene, e.g., in a quantity of 80% by volume, and lead powder, e.g., in a quantity of 20% by volume. The bronze layer is covered with an anti-friction layer, which consists of the polytetrafluoroethylene-lead mixture in a thickness of 10 to 30 microns. That mixture has been sintered out. Owing to the steel backing and the porous bronze layer that composite sliding surface bearing has a high compressive strength and a high thermal conductivity (Machinenmarkt/MM-Industriejournal 77, No. 6, of Jan. 19, 1971, "Lager ohne Öl"). It is also known to use polyacetal rather than polytetrafluoroethylene in such composite material for sliding surface bearings (VDI-Z. 110 (1968), No. 15, pages 632 to 636).

Said composite materials for sliding surface bearings have the disadvantage that the anti-friction surface must not be machined by lapping or shaving because the machining might destroy the anti-friction layer, which is important for the function of the bearing.

In view of developments in modern mechanical engineering, sliding surface bearings are desired which meet the increased requirements. From this aspect it is an object of the present invention to provide for sliding surface bearings a composite material which in its mechanical technological behavior in operation is at least equivalent to conventional composite materials for sliding surface bearings but which has an anti-friction surface which can be machined-particularly to form the anti-friction surface with pockets or grooves for receiving lubricant.

SUMMARY OF INVENTION

In a composite material for sliding surface bearings of the type described first hereinbefore, this object is accomplished in accordance with the invention in that the sintered bronze layer, preferably having a thickness of 250 to 350 microns, is filled with a fluorocarbon-lead mixture comprising 30 to 60% by weight polyvinylidene fluoride and 20 to 50% by weight lead and is covered with a mixture comprising 30 to 60% by weight polyvinylidene fluoride and 20 to 50% by weight lead. Preferably the covering material is the same as that which fills the pores or voids. The covering layer comprising polyvinylidene fluorine and lead can have a thickness of 30 to 500 microns.

In accordance with a further feature of the invention the polyvinylidene fluoride-lead mixture may also contain 5 to 30% by weight polytetrafluoroethylene.

In a preferred embodiment of the composite material for sliding surface bearings, the polyvinylidene fluoride-lead mixture is composed of 50% by weight polyvinylidene fluoride, 40% by weight lead and 10% by weight polytetrafluoroethylene. If the anti-friction layer should meet higher requirements regarding emergency running properties or conditional dry running properties, the anti-friction layer will preferably be composed of 38% polyvinylidene fluoride, 14% by weight polytetrafluoroethylene and 30% by weight lead.

BRIEF DESCRIPTION OF DRAWING

The structure of the composite material for sliding surface bearings according to the invention is shown in the accompanying drawing which is a cross-section of a bearing material of this invention.

DESCRIPTION OF SPECIFIC EMBODIMENT

Figure 1:
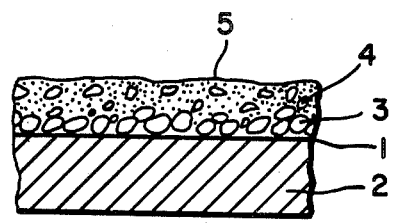

Referring to the drawing FIG. 1, steel backing 2 having a copper layer 1 is provided with a sinter-bonded porous layer made from spherical bronze powder, which consists of 80% by weight copper, 10% by weight lead and 10% by weight tin. The bronze layer 3 has a porosity of 40% and its voids have been completely filled in a rolling process at a temperature of about 240° C. with a mixture 4 consisting of 50% by weight polyvinylidene fluoride, 10% weight polytetrafluorethylene and 40% by weight lead. The bronze layer is covered with an anti-friction layer 5 comprising the same polyvinylidene fluoride-polytetrafluoroethylene-lead mixture in a thickness of 0.03 to 0.5 mm.

Figure 2:
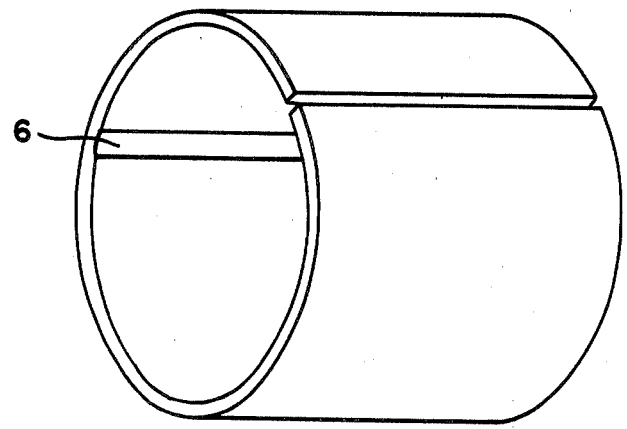
Figure 3:
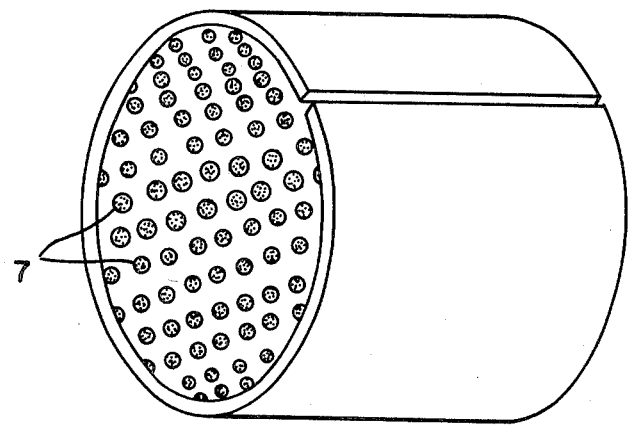

FIG. 2 shows a bearing with a lubrication groove 6.
FIG. 3 shows a bearing with lubrication pockets 7.

What is claimed is:

1. A composite material for a sliding surface bearing comprising a supporting shell of steel, which is covered by a bearing metal layer comprising sintered porous bronze having a porosity of 25 to 45%, the voids of which are filled with a fluorocarbon-lead mixture comprising 30 to 60% by weight polyvinylidene fluoride and 20 to 50% by weight lead, said bearing metal layer in turn covered by an anti-friction layer comprising 30 to 60% by weight polyvinylidene fluoride and 20 to 50% by weight lead, said anti-friction layer having pockets or grooves therein containing a lubricant.

2. A composite material according to claim 1 wherein the covering layer of polyvinylidene fluoride and lead has a thickness of 30 to 500 microns.

3. A composite material according to claim 2 wherein said bearing metal layer has a thickness of 250 to 350 microns.

4. A composite material according to claim 3 wherein said fluoro-carbon-lead mixture additionally contains 5 to 30% by weight polytetrafluoroethylene.

5. A composite material according to claim 4 wherein the fluoro-carbon-lead mixture filling said voids comprises at least 50% by weight of polyvinylidene fluoride and 40% be weight lead.

6. A composite material according to claim 5 wherein the fluorocarbon-lead mixture of said covering layer comprises at least 50% be weight polyvinylidene fluoride and 40% by weight lead.

7. A composite material according to claim 3, wherein the fluorocarbon-lead mixture of said covering material and the fluorocarbon-lead mixture filling said voids, comprises 38% by weight polyvinylidene fluoride, 14% by weight polytetrafluoroethylene and 38% by weight lead.

8. A bearing made of the composite material of claim 3.